(No Model.)

A. A. YACKEE.
COLTER FOR PLOWS.

No. 472,186. Patented Apr. 5, 1892.

Witnesses:

Inventor
August A. Yackee
By his Attorneys,

UNITED STATES PATENT OFFICE.

AUGUST ADAM YACKEE, OF ROBERTS, ILLINOIS.

COLTER FOR PLOWS.

SPECIFICATION forming part of Letters Patent No. 472,186, dated April 5, 1892.

Application filed August 4, 1891. Serial No. 401,653. (No model.)

*To all whom it may concern:*

Be it known that I, AUGUST ADAM YACKEE, a citizen of the United States, residing at Roberts, in the county of Ford and State of Illinois, have invented a new and useful Colter for Plows, of which the following is a specification.

This invention has relation to improvements in plows, the objects in view being to provide the same with means for cutting the sod and the brush at the land side of the plow, so that in a subsequent adjacent furrow the soil will be turned and not thrown back into the furrow by reason of the presence of such brush and sod.

Other objects and advantages of the invention will hereinafter appear, and the novel features thereof will be particularly pointed out in the claims.

Figure 1:
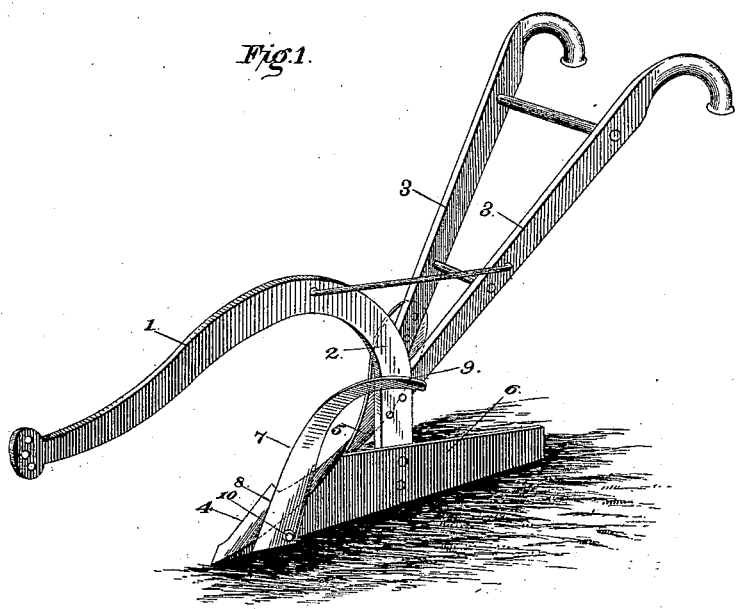
Figure 2:
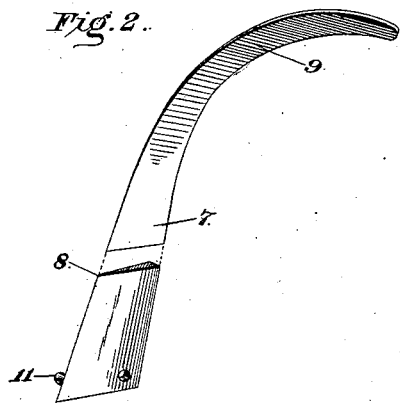

Referring to the drawings, Figure 1 is a perspective of a plow provided with my improvement. Fig. 2 is a detail, enlarged, of the improvement.

Like numerals of reference indicate like parts in both figures of the drawings.

1 designates the plow-beam, bent at its rear end to form the goose-neck standard 2, to which are secured the diverging handles 3, suitably braced, and at its lower end is secured the plowshare 4, having the usual mold-board 5 and landside 6.

7 designates a colter, which has the shape of an obtuse-angled triangle, the same consisting of a broad base, from which the colter vertically rises and is tapered. The front edge is ground to form a cutting-edge 8, and about midway the colter is rearwardly and outwardly curved, as at 9. The colter thus formed is secured by a bolt 10 to the landside and near the point of the plow and by an inwardly-disposed lug 11 taking into the point.

In operation the sod is cut, as is also any brush that may otherwise form an obstruction to the subsequent turning of the soil forming the next succeeding furrow, and said soil is thus prevented from being thrown back by the resistance offered by the brush and sod, and a perfectly-plowed clean field is presented, the soil from each furrow being nicely, evenly, and completely turned.

The provision of the lug or stud 11 saves the removal or application of one bolt when removing or applying the device.

Having described my invention, what I claim is—

1. The herein-described colter, adapted to be attached to the landside of a plow, the same consisting of a metal plate having a rearward and outward curvature and at its front terminating in a cutting-edge, substantially as specified.

2. The combination, with the plowshare, of a colter secured to the landside thereof, extending vertically, rearwardly, and outwardly therefrom and terminating at the front in a cutting-edge, substantially as specified.

In testimony that I claim the foregoing as my own I have hereto affixed my signature in presence of two witnesses.

AUGUST ADAM YACKEE.

Witnesses:
   JOSEPH B. LEACH,
   JAMES A. PETTIT.